T. BAGNELL.
WHEEL TIRE.
APPLICATION FILED OCT. 25, 1918.

1,392,736.

Patented Oct. 4, 1921.

Inventor
Thomas Bagnell

By
Attorney

UNITED STATES PATENT OFFICE.

THOMAS BAGNELL, OF HEMMINGFORD, QUEBEC, CANADA.

WHEEL-TIRE.

1,392,736.  Specification of Letters Patent.  Patented Oct. 4, 1921.

Application filed October 25, 1918. Serial No. 259,669.

*To all whom it may concern:*

Be it known that I, THOMAS BAGNELL, a citizen of the United States, residing at Hemmingford, in the Province of Quebec and Dominion of Canada, have invented new and useful Improvements in Wheel-Tires, of which the following is a specification.

The object of the invention is to provide a simple inexpensive and efficient wheel tire designed as a practical economical substitute for a pneumatic to avoid the disadvantage due to the liability to puncture of tires of the pneumatic type and furthermore to provide a construction for the purpose indicated which may be readily substituted for the ordinary tire structure without involving changes in the wheels now in common use.

With these and similar objects in view, as will appear in the course of the following description, the invention consists in construction, combination and arrangement of parts herein specifically set forth, it being understood that changes in form, proportion and details may be resorted to within the scope of the appended claim without departing from the spirit of the invention.

Figure 1:
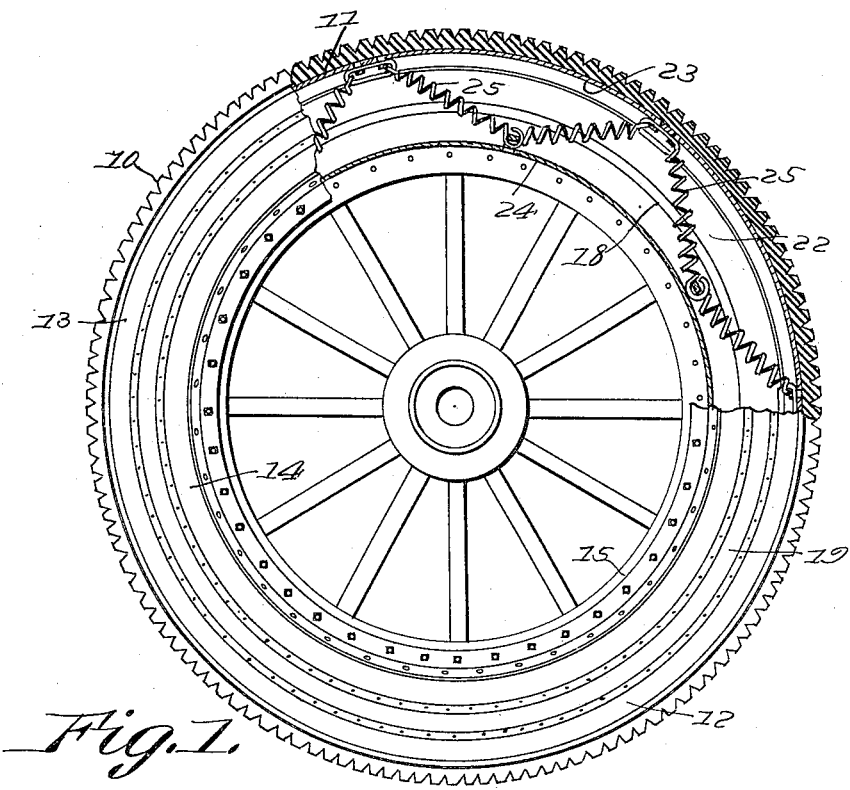

In the drawing Figure 1 is a side view partly in section of a portion of a wheel provided with tire embodying the invention.

Figure 2:
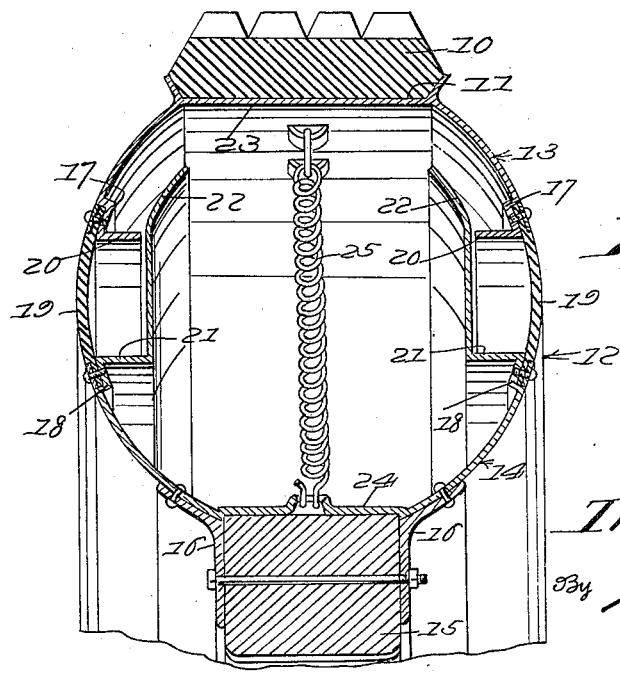

Fig. 2 is a detail transverse section of the tire and rim.

The tire consists essentially of a shoe member 10 which may be of rubber or rubber composition and may be corrugated to give the required traction, and the same is mounted in a seat 11 formed in the outer periphery of the hollow tire or shell indicated generally at 12 and consisting of the tread or shoe member 13 and the rim member 14, each of which is approximately semi-circular in cross section. Any suitable means for attaching the rim member to the felly 15 may be employed, such as the brackets 16 shown in detail in Fig. 2.

The tread and rim members of the tire are offset or shouldered inwardly at their adjacent edges as shown respectively at 17 and 18 to form seats for the reception of flexible webs 19 of rubber or equivalent material capable of yielding or bulging to permit of radial movement of the tread member relative to the rim member, and furthermore said inner edges of the said tire members are provided with approximately parallel ledges 20 and 21 from the inner edges of one of which project guards 22 which extend approximately parallel with the shell or exterior wall of the tire so that they serve the purpose of permanent closures to prevent access of dust or dirt to the interior of the tire and also as guides to direct the movement of the tread member relative to the rim member.

Also interposed between terminal seats 23 and 24 formed respectively on the inner surfaces of the tread and rim members are diagonally disposed expansion springs 25, any desired number of which may be employed to resist the inward radial movement of the tread member while permitting sufficient movement thereof to give the required resilience to the tire.

Obviously the webs 19 may be constructed of material affording some resistance to the relative movement of the tread and rim members of the tire so as to supplement the resistance afforded by the cushioning springs 25, but the principal functions of said webs, which should be reinforced as by metal at their edges as shown, are to limit the expansion or outward movement of the tread member relative to the rim so as to maintain a practical working condition of the guide means represented by the inturned flanges 20 and 21 and the guard 22 which, carried by one of said flanges, is arranged in a coöperative relation with the other flange to prevent objectionable lateral displacement of the tread member relative to the rim member.

Obviously the device as described may be substituted for the ordinary pneumatic tube and shoe, now employed, or the essential feature thereof may constitute the means for maintaining the inflation or expansion of a shoe in which the same may be inclosed.

Having described the invention I claim:

A wheel tire having tread and rim members of substantially semi-circular contour in cross section and interposed resilient means housed thereby, said members being provided on both sides and adjacent their proximate edges with inturned annular flanges paralleling each other throughout their perimeters, the flanges on one member being formed with annular guards at their inner edges, the said annular guards extending approximately parallel with the exterior wall of the tire and overlapping the inner edges of the other flanges, whereby relative lateral movement between the tread and rim members is precluded.

In testimony whereof I affix my signature.

THOMAS BAGNELL.